(12) United States Patent
Manson et al.

(10) Patent No.: US 6,495,091 B1
(45) Date of Patent: *Dec. 17, 2002

(54) PROCESS FOR THE MANUFACTURE OF POLYMER AND COMPOSITE PRODUCTS

(75) Inventors: Jan-Anders Manson, Rivaz (CH); Pierre-Etienne Bourban, Prangins (CH); François Bonjour, Préverenges (CH)

(73) Assignee: Ecole Polytechnique Federale de Lausanne, Lausanne (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,075

(22) PCT Filed: May 17, 1996

(86) PCT No.: PCT/IB96/00467

§ 371 (c)(1),
(2), (4) Date: Nov. 18, 1997

(87) PCT Pub. No.: WO96/36477

PCT Pub. Date: Nov. 21, 1996

(30) Foreign Application Priority Data

May 18, 1995 (GB) ............................................. 9510046

(51) Int. Cl.[7] .......................... B29C 70/48; B29C 45/16
(52) U.S. Cl. ...................... 264/572; 264/136; 264/137; 264/250; 264/257; 264/266; 264/267; 264/271.1; 264/279.1; 264/294; 264/322; 264/324; 264/325; 156/245
(58) Field of Search ................................ 264/257, 572, 264/258, 266–267, 136, 137, 271.1, 328.13, 250, 254, 255, 234, 297.2, 279.1, 297.3, 297.6, 297.7, 322–325; 106/245

(56) References Cited

U.S. PATENT DOCUMENTS

| | | | | | |
|---|---|---|---|---|---|
| 3,137,750 | A | * | 6/1964 | Gringras | 264/257 |
| 4,044,188 | A | * | 8/1977 | Segal | 428/283 |
| 4,065,340 | A | * | 12/1977 | Dickerson | 156/154 |
| 4,133,627 | A | * | 1/1979 | Kontz | 425/525 |
| 4,396,566 | A | * | 8/1983 | Brinkmann et al. | 264/70 |
| 4,462,946 | A | * | 7/1984 | Goldsworthy | 264/23 |
| 4,600,617 | A | * | 7/1986 | Cole | 428/64 |
| 4,692,291 | A | * | 9/1987 | Angell, Jr. | 264/109 |
| 4,780,432 | A | * | 10/1988 | Minford et al. | 501/32 |
| 4,816,313 | A | * | 3/1989 | Hosokawa et al. | 428/90 |
| 4,933,131 | A | * | 6/1990 | Okey et al. | 264/255 |
| 4,952,366 | A | * | 8/1990 | Gelin | 264/511 |
| 4,957,677 | A | * | 9/1990 | Katoh et al. | 264/135 |

(List continued on next page.)

FOREIGN PATENT DOCUMENTS

GB        2 209 159 A    *    5/1989

*Primary Examiner*—Stefan Staicovici
(74) *Attorney, Agent, or Firm*—Woodard, Emhardt, Naughton, Moriarty & McNett

(57) ABSTRACT

The invention is concerned with an integrated process for the manufacture of polymer and/or composite products, comprising the integration of processing operations to achieve a plurality of material conversion steps, such as impregnation, consolidation and bonding, within one single controlled fabrication cycle. The process includes an in-situ final preparation of at least one composite preform at the location of the moulding operation and an integrated moulding operation comprising a step of providing an additional matrix-functioning material into the mould to at least partially enclose the composite preform, the operation of providing the additional matrix-functioning material providing the pressure for an in-situ final consolidation of the composite product.

11 Claims, 10 Drawing Sheets

U.S. PATENT DOCUMENTS

| | | | | |
|---|---|---|---|---|
| 4,978,360 A | * | 12/1990 | Devanathan | 623/66 |
| 5,041,260 A | * | 8/1991 | Johnson et al. | 264/510 |
| 5,049,342 A | * | 9/1991 | Scanlon et al. | 264/250 |
| 5,089,189 A | * | 2/1992 | Staneluis et al. | 264/45.3 |
| 5,121,329 A | * | 6/1992 | Crump | 364/468 |
| 5,145,615 A | * | 9/1992 | Kim et al. | 264/25 |
| 5,217,654 A | * | 6/1993 | Buckley | 264/22 |
| 5,229,052 A | * | 7/1993 | Billiu | 264/115 |
| 5,266,139 A | * | 11/1993 | Yokota et al. | 156/169 |
| 5,310,582 A | * | 5/1994 | Vyakarnam et al. | 427/560 |
| 5,320,511 A | * | 6/1994 | Woerner | 425/130 |
| 5,340,433 A | * | 8/1994 | Crump | 156/578 |
| 5,355,567 A | * | 10/1994 | Holliday | 28/282 |
| 5,364,258 A | * | 11/1994 | Buckley et al. | 425/501 |
| 5,368,793 A | * | 11/1994 | Lau | 264/39 |
| 5,401,154 A | * | 3/1995 | Sargent | 425/114 |
| 5,456,957 A | * | 10/1995 | Jackson et al. | 428/31 |
| 5,482,667 A | * | 1/1996 | Dunton et al. | 264/136 |
| 5,503,466 A | * | 4/1996 | Lew | 301/5.3 |
| 5,516,271 A | * | 5/1996 | Swenor et al. | 427/127 |
| 5,560,942 A | * | 10/1996 | Curry | 425/363 |
| 5,595,692 A | * | 1/1997 | Folsom et al. | 264/36 |
| 5,721,047 A | * | 2/1998 | Thicthener et al. | 428/368 |

* cited by examiner

PROCESS FOR THE MANUFACTURE OF POLYMER AND COMPOSITE PRODUCTS

The present invention relates to a process for the manufacture of polymer and/or composite products and to the related equipments.

BACKGROUND OF THE INVENTION

Polymers and polymer composites have the advantages of weight saving, high specific mechanical properties and good corrosion resistance which make them indispensable materials. Nevertheless, manufacturing costs are sometimes detrimental, since they can represent a considerable part of the total costs. Furthermore, the production of complex shaped parts is still a challenge for the composite industry. Parts with relatively simple geometries are common place today for composites; pre-peg manufacturing, autoclave, filament winding, pultrusion, etc. are examples of well-developed technologies. But the production of complex 3-dimensional parts usually requires injection moulding or compression moulding of short fibre composites ("engineering composites"). The drawback of short fibre reinforced composites is their considerable lower intrinsic specific mechanical properties. Assembly technologies used to obtain complex geometry for advanced composites are sometimes inefficient and not cost-effective.

The proper selection of a material system and process for manufacture of composite parts depends on a number of factors including material processability, design, part performance, and manufacturing economics [see in particular J.-A. E. Manson, New demands on manufacturing of composite materials, in High-performance composites, Ed. K. K. Chawla, P. K. Liaw, S. G. Fishman, TMS, Warrendale, Pa., (1994)].

As shown in FIG. 1, which shows a mapping of composite processing techniques with respect to their ability for complex shaping and annual production volumes, the number of parts to be produced and the required part size and complexity influence the selection of a suitable manufacturing process [see in particular W. J. Lee and J.-A. E. Manson, "Factors Influencing Process Selection and Processing" (Proceedings: Polymer Composite Applications for Motor Vehicles, SAE International, Detroit, USA, Feb. 25, 1991) 35.]. For low number of parts to be manufactured, a process which requires lower investment in tooling and equipment costs but longer cycle times and more labour may be favoured.

The limited potential for complex shape forming offered by advanced composite materials leaves little scope for design freedom in order to improve mechanical performance and/or integrate supplementary functions. This has been one of the primary limitation for a wider use of advanced composites in cost-sensitive large volume applications. Contrary to most traditional composite applications, many applications in, for example, the mechanical industry are small and are of more complex three-dimensional shapes, which are normally produced by casting techniques.

Traditional injection moulding, provides almost unlimited possibilities for shaping. Here, considerably greater design freedom for mechanical performance is achieved with a considerably cheaper material. However, the intrinsic mechanical properties are also lower, given the short fibre materials used, and so the potential for both load bearing and weight saving is diminished.

In most cases performance improvement has been achieved by the development of material systems with improved intrinsic properties (fibre types, resin systems and fibre content). These developments have also driven up raw material costs and the interest in branches with cost-sensitive applications has been reduced, slowing down the introduction of composite applications.

Increased design freedom nevertheless opens many possibilities for engineering solutions which may considerably increase the interest for composite materials in structural applications. FIG. 2 gives an indication of this dilemma. Most of the manufacturing techniques used today for composite materials may be placed on the exponentially-shaped band as indicated in the diagram.

Given the demands of many industries today, it is obvious that. the desired direction for future development is towards the upper right-hand corner of the diagram. The development of material systems with both high intrinsic properties and improved formability for complex shapes may only be ensured by close interaction during the development of the material preforms and of the processing techniques.

In this view, several material systems and manufacturing techniques are today under development, aiming to improved complex shape forming of advanced composites under attractive manufacturing conditions. Novel material systems using either pre-impregnated preforms or post-shaping impregnation are being closely studied by several research groups [see in particular A. G. Gibson and J.-A. E. Manson, "Impregnation Technology for Thermoplastic Matrix Composites," Journal of Composites Manufacturing, 3 (4) (1992), 223–233, F. Neil Cogswell, Thermoplastic Aromatic Polymer Composites (Oxford: Butterworth-Heinemann, 1992) and J.-A. E. Manson, "Processing of Thermoplastic-based Advanced Composites", Advanced Thermoplastics and their Composites, ed. H-H. Kausch (Munich: Carl Hanser Verlag Gmbh. 1992), 273]. Powder preform techniques have so far been the most explored route to improved complex formability with thermoplastic-based composites, but automated tape placement methodologies have also shown promise [see in particular K. V. Steiner, E. Faude, R. C. Don and J. W. Gillespie Jr., "Cut and Refeed Mechanics for Thermoplastic Tape Placement," (Proceedings of the 39th International SAMPE Symposium, Anaheim, Calif., 1994), 2627].

The potential conversion routes for composites, from fibre and matrix to finished products are illustrated on FIG. 4. Traditionally each processing steps (FIG. 3) are developed by separate companies and semi-products delivered to the next link of the processing chain.

It is by no means clear that an optimal matrix material for a composite, in terms of fibre-matrix adhesion, is suited for the other demands set upon a composite part. For instance, environmental resistance and tribological performance may not always be given by a typical matrix material. Furthermore, a high fibre content will normally have a negative influence on the surface finish of the product. The free-forming potential of neat polymers or short fibre systems will always be superior to that of continuous fibre materials. In addition, a well-known strategy to reduce cost is to reduce the number of sub-components in complex structures while integrating multiple functionality. To meet several of these requirements with one material or one processing technique may not be possible.

Considering these points it is clear that higher flexibility of the composite materials is required in many applications to increase the material's attractiveness to design engineers. A more integrated approach using complementary materials and processes in the fabrication of the part would be desirable.

The logical step seemed therefore to integrate as far as possible the individual processing operations illustrated on FIG. 4.

SUMMARY OF THE INVENTION

The aim of the present invention is to propose novel processing techniques and equipments permitting to remedy to the disadvantages of the existing techniques and in particular to reduce manufacturing costs by the suppression of intermediate processing and assembly stages.

Therefore, the invention concerns a novel processing technique where neat polymers, reinforcements and/or preforms and/or composites are combined in a single operation, by combining several processes into a single step or as a sequence of steps in rapid succession, where simultaneous material and process integration is achieved.

As shown in FIG. 7 this integrated processing technique offers larger design freedom, performance integration and multifunctionality in complex shaped composite parts.

An object of the present invention is an integrated processing unit allowing an automated combination of processing steps such as tow placement, consolidation, internal stress release, press-forming, horizontal and vertical injection moulding, inner-gas-forming, slit-die extrusion and liquid injection for integrated multi-component or multi-functional parts.

Another object of the invention is a sheet impregnation unit comprising several stations for manufacturing of composites preforms such as fibre lay-up, powder lay-up, impregnation, preconsolidation and lofting.

Still another object of the invention is a multi-task robotised unit permitting an automatic control synchronisation between all processing units of the equipment, such in particular tow placement, composite preparation, combination of preforms and manipulations of tools, preforms and processed parts.

Still another object of the invention is a tow impregnation unit arranged to deliver tow preformdirectly into the moulds.

Integrated processing is the use of an automated sequence of forming operations in rapid succession. A comparison of processing cycles for conventional and integrated processing to produce a single complex component is illustrated on FIG. 5, which refers to conventional processing, and FIG. 6, which refers to integrated processing, where 1 refers to a first processing step, 2 to a second processing step, 3 to bonding of processed components issued of said first and second steps, T represents a transfer to another equipment and F the finishing operations.

Further opportunities lie in the combination of materials of high mechanical performance with engineering plastics in the same component.

Integrated processing provides the means of using advanced composites for high performance, and engineering plastics for geometry and appearance, in demanding structural components with maintained design benefits and attractive manufacturing costs.

The integrated processing facilitates an automated consecutive processing cycle, including both high and low pressure forming, techniques. Furthermore, the equipment permits pre-impregnated preforms, drapable preforms for post-shaping impregnation and short fibre compounds to be processed. It is obvious that inter-material bonding and management of internal stress generation play an important role in the process. Initial work performed on classical presses has shown that by careful selection of materials and processing conditions sufficient bond strength may be obtained at cycle times in the order of minutes [G. D. Smith, S. Toll and J.-A. Màson, "A study on Interface Healing in Polypropylene Processing" (Flow Processes in Composite Materials '94) and G. D. Smith, S. Toll and J.-A. E. Màson, "Integrated Processing of Multi-Functional Composite Structures," (Proceedings of the 39th International SAMPE Symposium, Anaheim, Calif., 1994), 2385].

The following objectives have been considered:

Integration of Materials

Investigation and modification of compatibility between integrated polymeric materials (neat polymers, preforms and composites)

Optimisation of adhesion mechanisms during integrated processing sequences

Evaluation of bond strength and management of stress state in multi-component parts Prediction of dimensional stability and durability of integrated parts Integration of Manufacturing Processes Integration of fast, low pressure processing techniques Combination of the process windows of all integrated materials Integration and automation of process sequences Improvement of equipment flexibility and cost-efficiency The performance of a structural part does not depend only on geometric parameters. For composites more than for other traditional materials, material properties and functional requirements are part of any optimum design. According to the invention, the integration of various material types into complex shaped parts introduces new perspectives in parts design.

Up to now, combinations of several polymers have been studied by numerous industries for different applications. For example multimaterial injection has-been used for automotive multicolor lens or food containers. Electronics and hygiene/cosmetics industries are other application sectors. Coextrusion is another example of a technique successfully developed for multilayer packaging.

The integration processing according to the invention is appealing and one can now combine reinforced polymers and composite preforms with surrounding neat polymers. By a judicious disposition of high tailorable intrinsically stiff composites the load transmission is optimised. Then non-structural components are moulded to keep the composite in place and to fulfil additional requirements like surface properties, and/or other supplementary functions.

Different types of materials are envisaged for integration, neat and modified thermoplastic and/or thermoset polymers, reinforcements, particles and fibres reinforced polymers, composites, metals. Subsequently and as illustrated in FIG. 8, various functions can be integrated in one part: complex geometry, load transmission and stiffness 4, connection using inserts and integration of sub-structures 5 (channels, doors, fastening elements . . . ), wear and corrosion resistance, surface finishing 6 and heat insulation or transfer.

Consequently, owing to material integration, multi-functionality and fine tailoring of performances (FIG. 9) are proposed by the developed integrated processing:

bulk performances: stiffness and strength, damping surface performances: surface protection, surface finish, tribological properties shape performances: continuous or discontinuous shape function performances: temperature shielding, close tolerances, multi-functionality.

We will now describe, by way of example, the equipment and the different units used in relation with the integrated processing system. This will be followed by a description of the material processing steps and by examples of integrated manufacturing routes.

DESCRIPTION OF THE EQUIPMENT

The total concept of the integrated processing of composite materials according to the invention comprises both process and material integration, as well as a methodology for the manufacturing of high performance polymer and composite parts at high efficiency and under controlled quality performance. To achieve multi-functionality, performance integration and complex shapes, a unique integrated manufacturing equipment has been developed.

Figure 1:
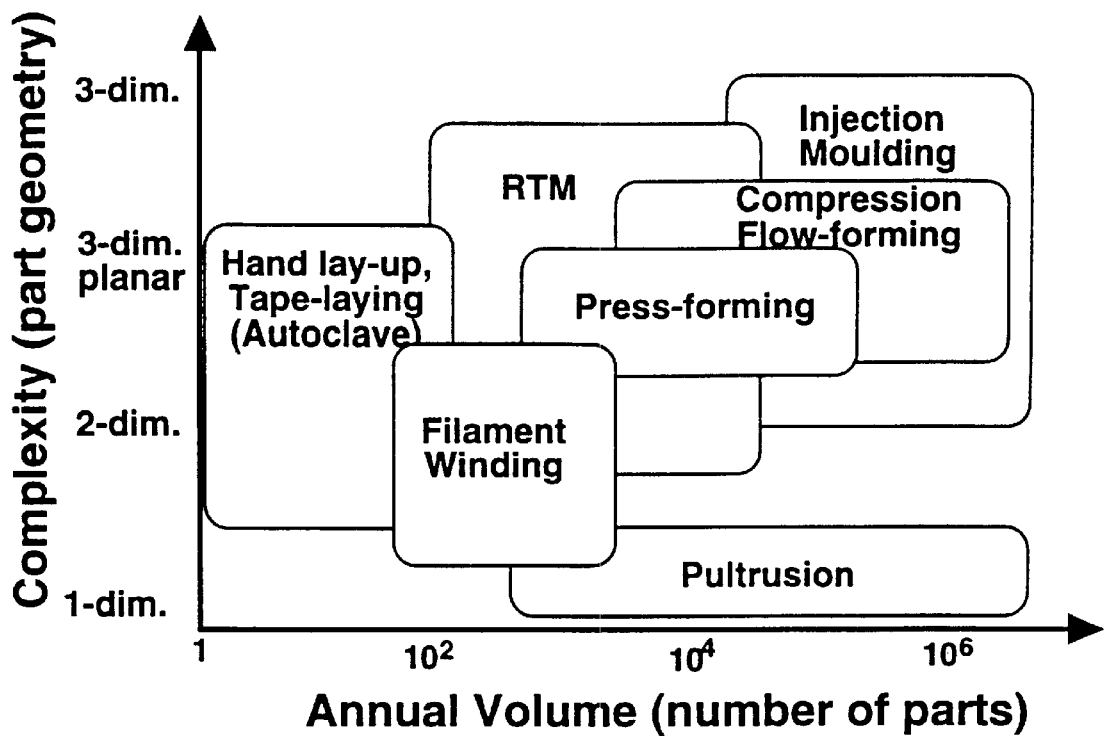
FIG. 1 is a mapping of composite processing techniques with respect to their ability for complex shaping and annual production volumes.
Figure 2:
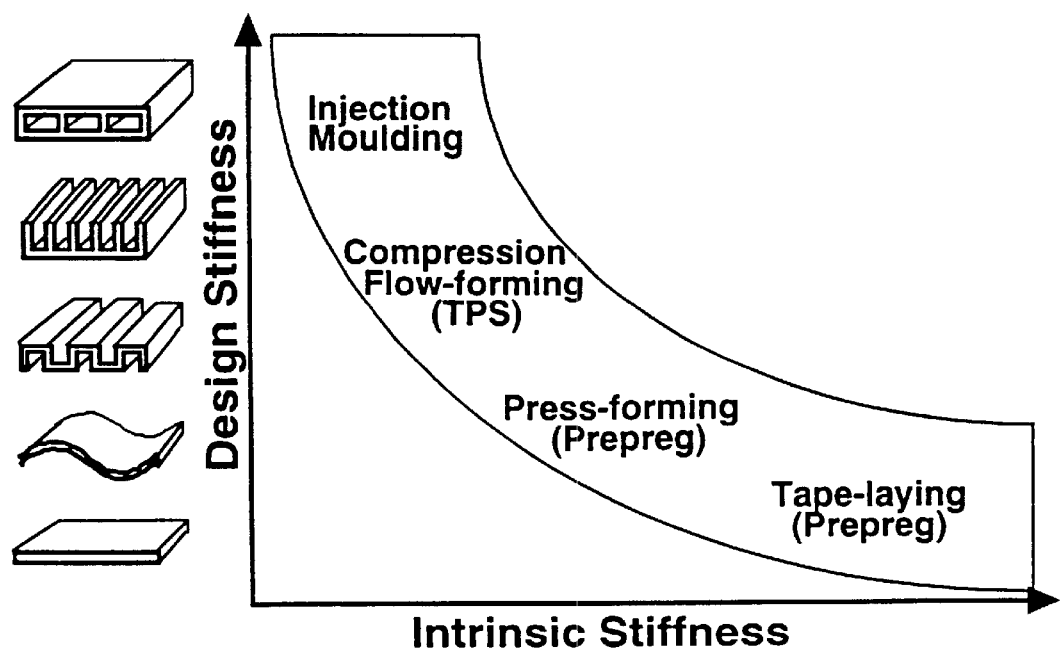
FIG. 2 is a schematic illustration of the potential for stiffness design by complex shape forming versus intrinsic stiffness of the composite, by different processing techniques.
Figure 3:
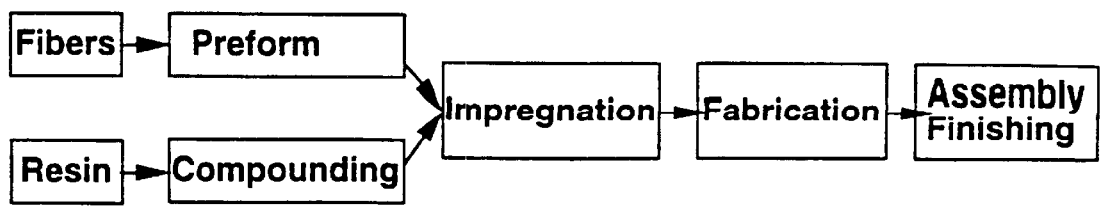
FIG. 3 illustrates the traditional processing steps.
Figure 4:
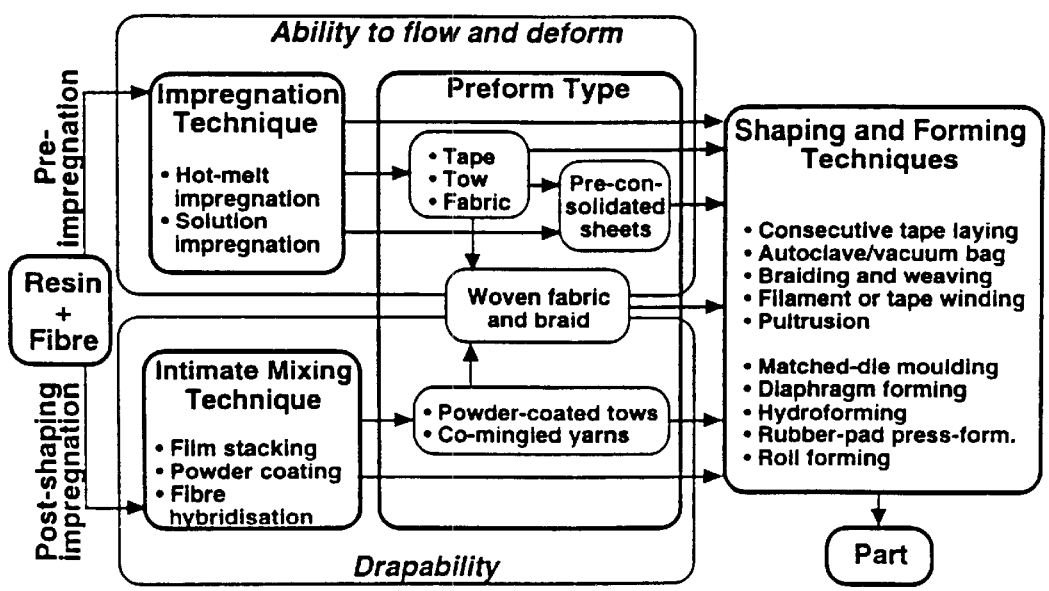
FIG. 4 illustrates the various existing manufacturing routes for advanced composites.
Figure 5:
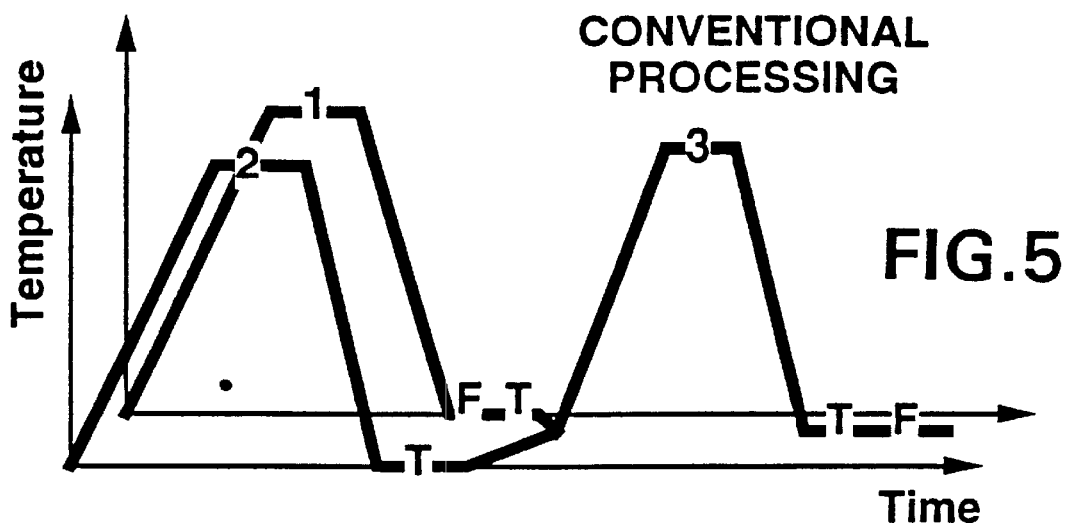
FIGS. 5 and 6 illustrate a comparison of processing cycles for conventional and integrated processing.
Figure 6:
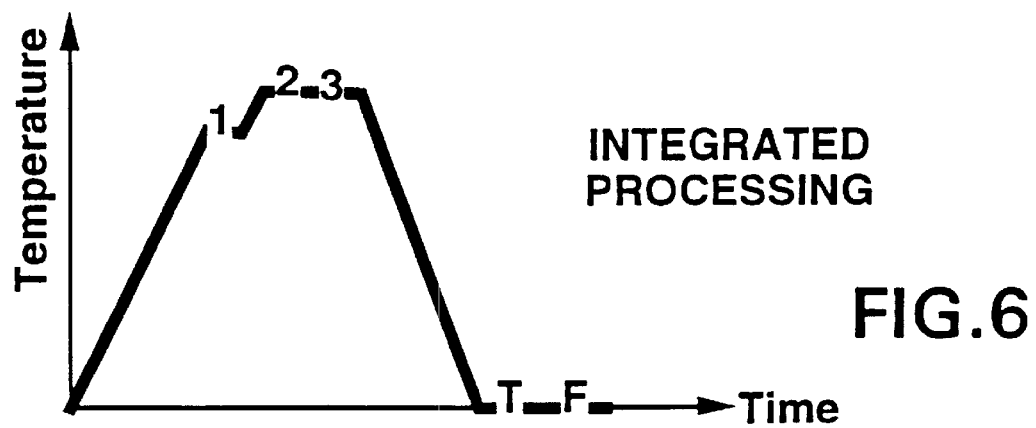
Figure 7:
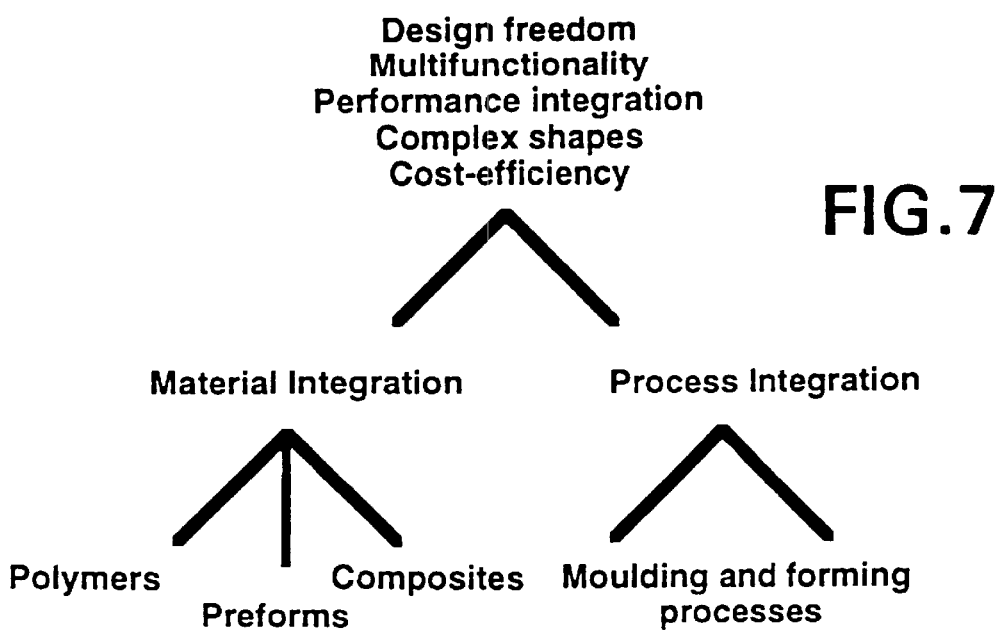
FIG. 7 illustrates the integrated processing concept.
Figure 8:
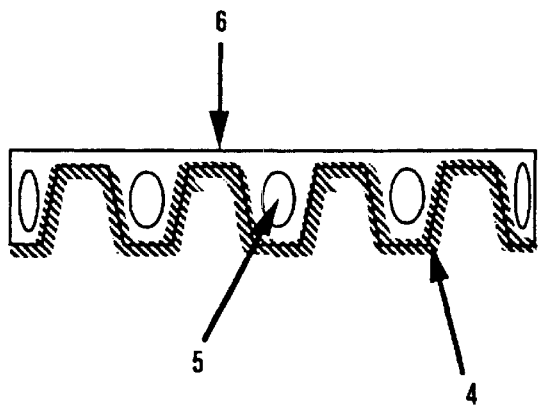
FIG. 8 is a schematic representation illustrating the integration of functions achieved in one simple part during one sequence of integrated processing.
Figure 9:
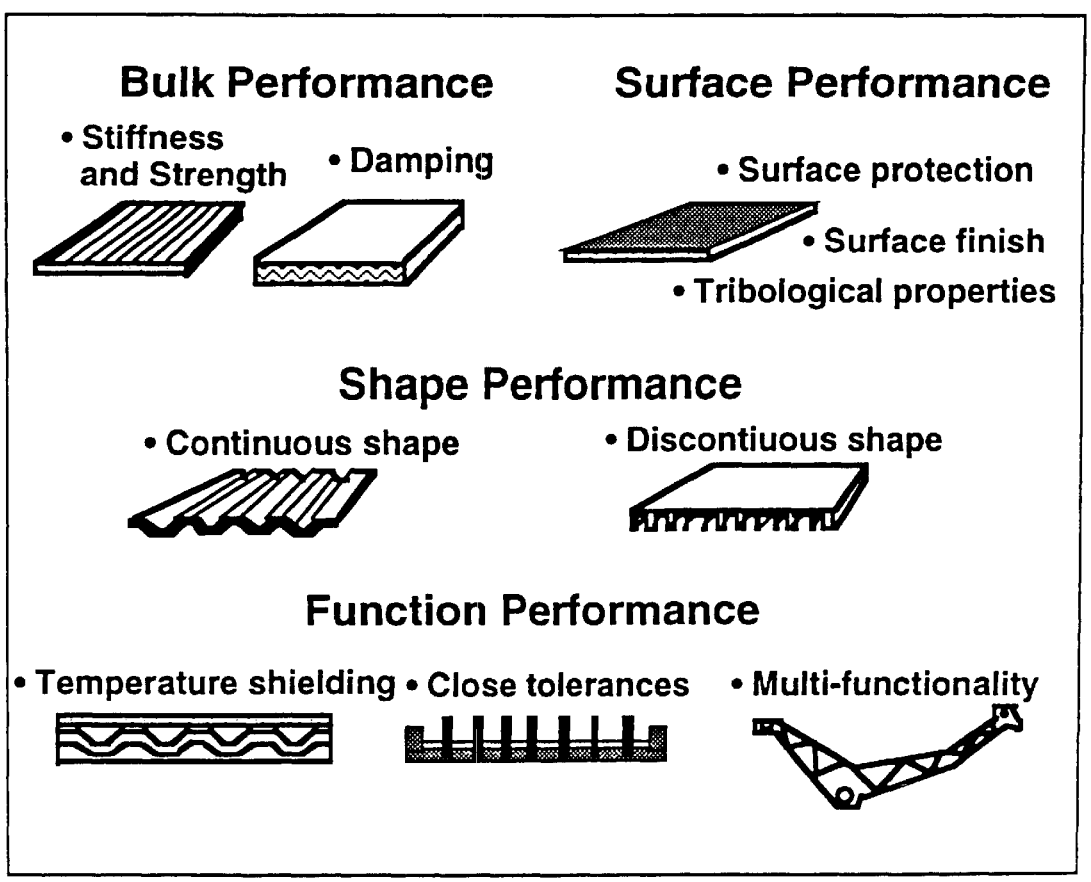
FIG. 9 illustrates some examples of performance integration.

The option of having various processing techniques (see FIGS. 3 and 4) assembled in one machine appears very interesting for the development of fast, flexible and cost-effective manufacturing. A combination of different processing techniques previously presented in FIG. 1, such as compression moulding, forging, multi-material injection moulding, inner-gas-forming and extrusion is being proposed.

Figure 10:
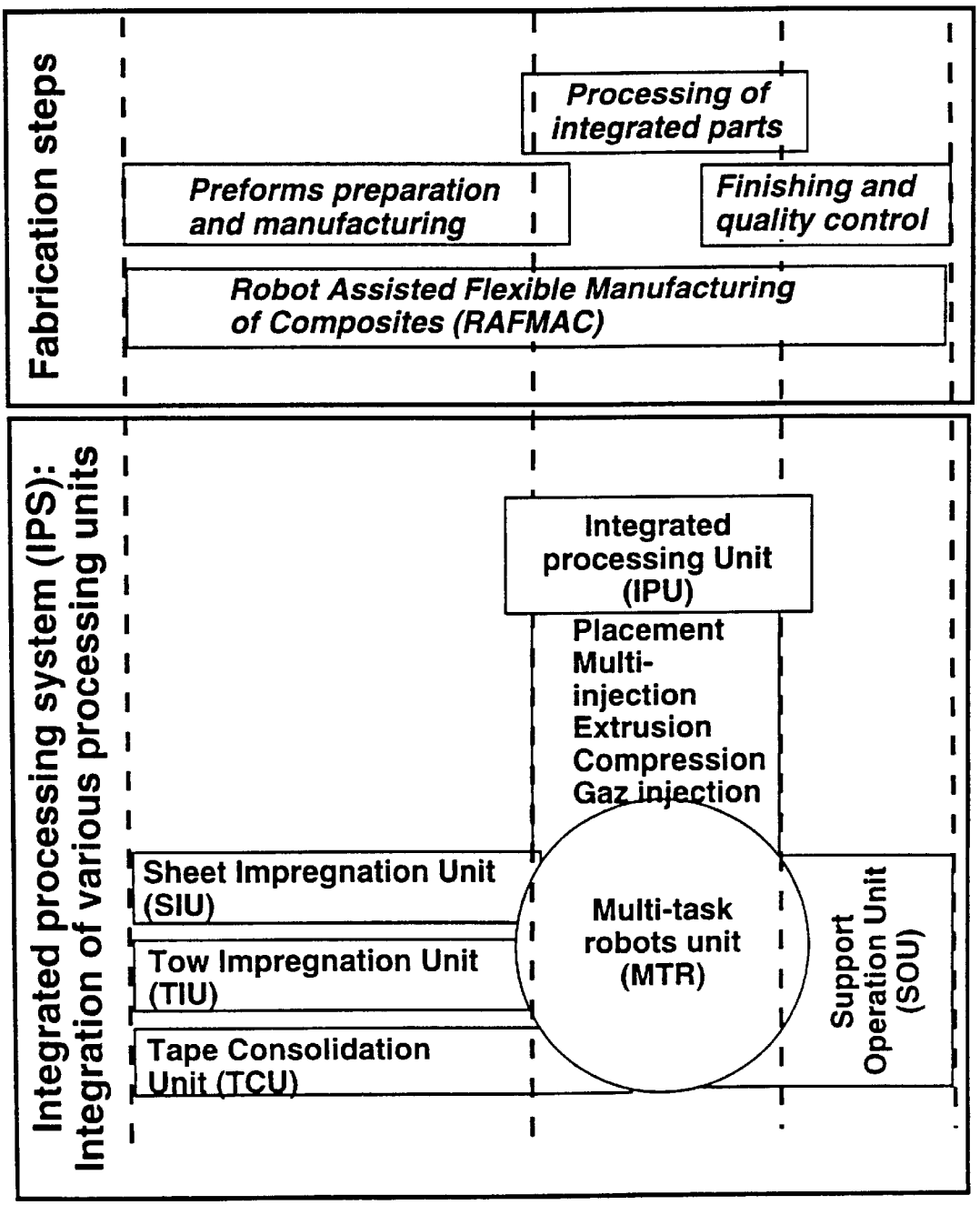
FIG. 10 illustrates the combination of different fabrication steps included in the integrated processing concept via the flexible selection of several processing units of the developed global equipment.

Different novel processing equipments, namely Integrated Processing Unit (IPU.), Sheet Impregnation Unit (SIU), Tow Impregnation Unit (TIU) and Multi-Task Robot (MTR) are described here and can be used in an unified and combined manner during a manufacturing cycle (FIG. 10).

Figure 11:
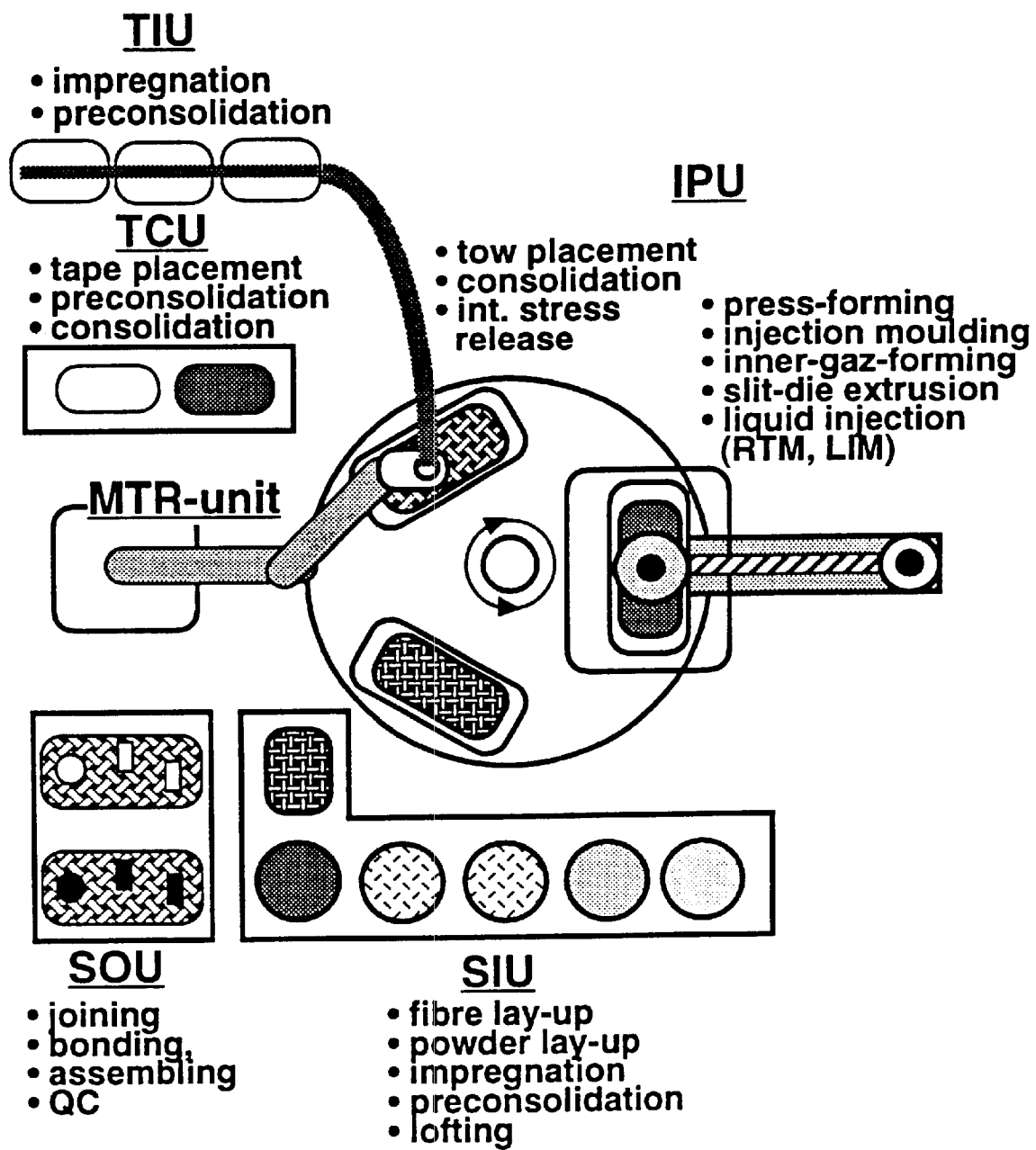
FIG. 11 is a schematic plan view of the Integrated Processing System (IPS) describing the different units and its related processing steps.

A principle lay-out of the equipments and the related processing steps are indicated on FIG. 11.

The Integrated Processing concept allows different combinations of IPU, SIU, TIU by the use of MTR for the manufacturing of a specific part depending on shape and property demands. These various process combinations will be defined hereunder as the Robot Assisted Flexible Manufacturing Concept for Composites (RAFMAC). Description of all units will precede the presentation of different possible material processing steps. Examples will follow to illustrate the RAFMAC methodology.

The integrated processing unit (IPU), the Sheet Impregnation Unit (SIU) and the Multi-Task Robots (MTR) used for fibre placement are original concepts and machine systems. Although some ideas of the individual units are not entirely new, a unique improved and flexible line has been realised and some elements self-developed. On-line tape consolidation equipment, assembling, finishing and quality control units already exist separately on the market. Their integration to the processing equipment is envisaged here in terms of automation, flexible processing strategies and adaptation to be used in combination with other processing techniques.

Table 1 summarises the various units proposed to achieve the goals of the integrated processing concept.

TABLE 1

| Unit | Abbreviation |
| --- | --- |
| Sheet impregnation unit | SIU |
| Tow impregnation unit | TIU |
| Tape consolidation unit | TCU |
| Integrated processing unit | IPU |
| Multi-task robots unit | MTR |
| Support operation unit | SOU |
| Finishing | FU |
| Assembling | AU |
| Quality control | QCU |

The Integrated Processing Unit (IPU)

Figure 12:
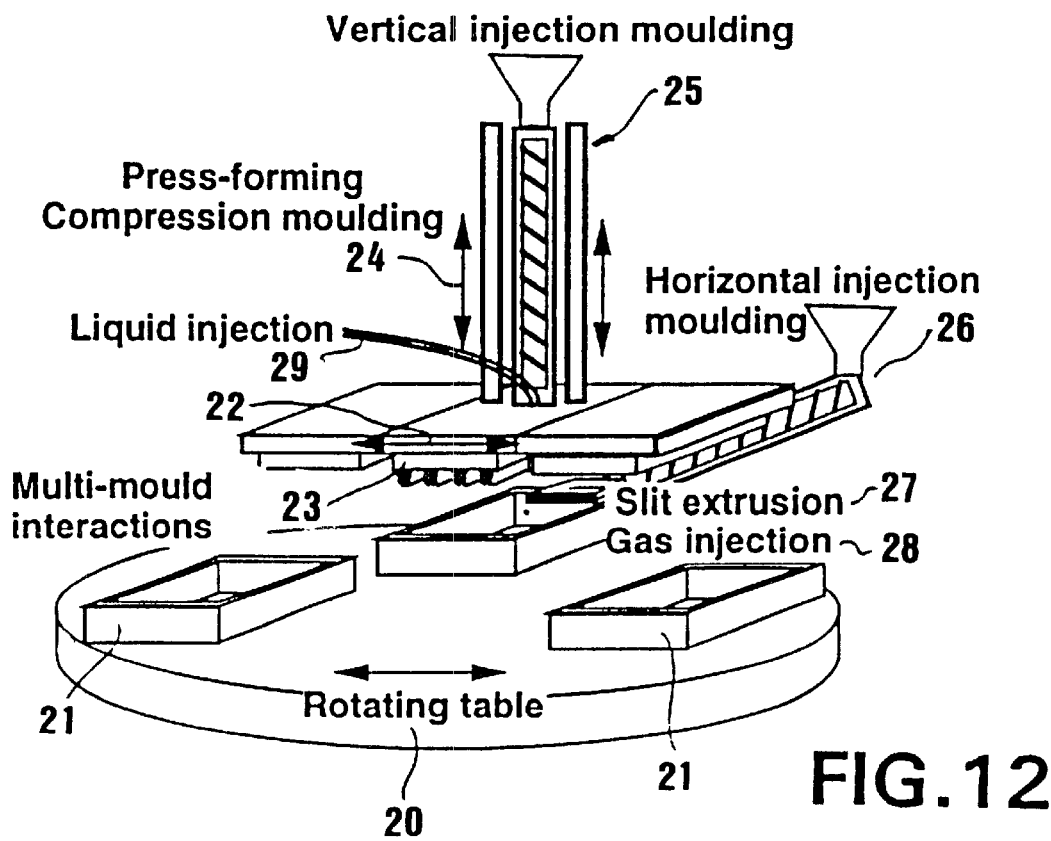
FIG. 12 is a schematic view of the integrated processing unit (IPU) and its different sub-units or components, each of them being one polymer- or composite-processing technique.

The main functions of this unit are:
- offer flexible processing (combination of processing techniques) for multi-constituent integrated parts
- realise the automation of combined processing operations
- allow sequential operations to be performed in one cycle
- provide final consolidation pressure and temperature for material-form integration A schematic illustration of the integrated processing unit is presented in FIG. 12. The machine comprises a lower rotating table 20 on which at least one lower half-mould 21 can be removably fixed. The unit represented on FIG. 12 comprises three lower half-moulds 21. An upper sliding table 22, comprising at least one upper half-mould 23, arranged to cooperate with the lower half-moulds 21, is connected to a press forming unit 24 and a vertical injection unit 25. On the example of FIG. 12, three upper half-moulds are available. The machine can further comprise a horizontal injection unit 26, where a slit extrusion head 27 or a gas injection head 28 can be mounted. A gas injection head can also be mounted on the vertical injection unit 25. A liquid injection entry 29 can be provided in one of the half-moulds. The synchronisation of all the different above mentioned elements of the machine are controlled by a computer and an adequate software.

All assembled techniques can be used individually. Furthermore, the command allows to define and to control a large number of automatic sequences. Each sequence combines different processes (compression-injection-extrusion-etc.) which are executed into one or several interchangeable moulds. The different mould combinations allows the manufacturing of a complex shaped part built-up of different material and/or different preform types. The different processing techniques permit the use of the most suitable processing technique to be used for the specific material and/or preform type.

The IPU allows the following processing techniques to be used in parallel or sequentially:
a) horizontal injection moulding: conventional injection unit is used
b) vertical injection moulding: conventional injection unit is used
c) adaptation for liquid injection moulding (RTM: Resin Transfer moulding, LIM: Liquid injection Moulding, RIM: Resin injection moulding)
d) inner-gas-forming (gas-injection): a special air injector is adapted
e) slit-die extrusion: a special developed extrusion head can be adapted to the injection unit, to provide interfacial compatibilisation layers or surface coating layers
f) advanced composite press-forming: the closing unit is designed to apply high pressure on moulding set-up placed on the rotational table
g) multi-mould (2×3 mould-halves) interactions: 6 mould halves with different geometries can be fixed on two tables which permit automatic rotation and translation of the moulds
h) mould temperature control and fast mould temperature cycling between −20° C. to 400° C.: conventional heating units and pipes are used to heat, cool and transport the heating and/or cooling medium.

The specific capabilities of the IPU are:

Multi-injection/compression:
Combination of different polymer and composite preform types to be used in manufacturing of complex-shaped polymer and composite parts Material integration and reduction of cycle time by integrated processing steps:
Reliable material integration via optimal joining (healing) conditions is obtained by controlled and tailored pressure, temperature and time cycles.
By the injection of the melt into a mould cavity already charged with the preform additional consolidation of the composite preform is achieved. The additional melt will also eliminate resin starved areas, given by the draping of the preform during its shaping deformation.

Slit-extrusion:
Extrusion of interlayers is used in order to facilitate in-situ joining of materials (parts) with limited compatibility. The extruded interlayer serves as an adhesion promoter for the joining of the two materials.
Surface layers are applied by extrusion to achieve specific surface performance (coatings).

Liquid injection:
The IPU allows connections for liquid injection (RTM, LIM, RIM). This capability permits reactive polymers to be used in the moulding process.

Inner-gas-forming (Gas-injection):
Use of gas-injection allows to manage the residual stress release for control of the dimensional stability. This may facilitate integration of materials with different thermomechanical characteristics and/or material moulded at sequential temperature steps.

Forming of hollow parts by inner-gas forming (gas-injection):
The gas-injection unit allows inner pressure moulding of hollow structures to be performed. Gas-injection allows deformation of the preform to the outer-walls of the mould and with maintained hollowed structure.

The Sheet Impregnation Unit (SIU)

Figure 13:
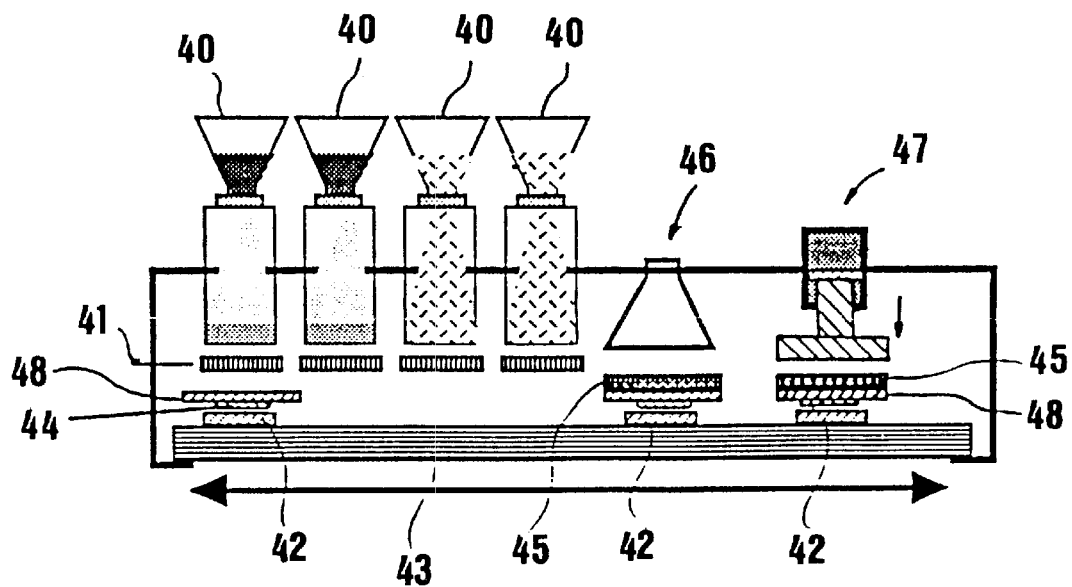
FIG. 13 is a representation of an example of controlled preform manufacturing equipment for sheet impregnation (SIU).

The main functions of this unit are:
build-up individually designed composite preforms
control the orientation distribution of the fibre lay-out
combine several reinforcement types and geometries
combine several material types
fabricate preforms with gradient properties The SIU comprises several stations for manufacturing of composite preforms (FIG. 13).

The different components and functions of the SIU are:
a) multiple stations 40 for resin and fibre charging,
b) one or several amplitude and/or frequency controlled collimators 41 can be used to control fibre orientation into the preform,
c) a moving element 42 mounted on a rail 43. The element 42 has been represented in three positions in FIG. 13,
d) an electronic balance 44 on the moving support is used to control weight (volumetric) fraction during the fibre and resin charging; the balance 44 is provided with a controlled rotational preform support 48 which permits to fabricate orientation-controlled lay-up (spatial or continuous orientation distribution),
e) the set-up allows to repeat several sequential lay-up to build up the preform structure 45,
f) a preform preconsolidation unit, comprising a heating device 46 (for example an infra-red heater) and a press device 47, is also shown on FIG. 13.

The specific capabilities of the SIU are:

Freedom in preform design:
Combination of several reinforcement types and reinforcement aspect ratios (including continuous fibres) into one preform is an important part of the material integration concept because the structure and content of reinforcement determine the final part performance.
Discrete or continuous reinforcement orientation variations can be obtained over the thickness of the preform. Variation of lay-up order, reinforcement orientation, reinforcement type and reinforcement content, as well as material types can be varied within a preform.

Control of subsequent processing steps:
Tailored preform can be design for flow and/or warpage control. Preform variation from piece-to-piece can directly and easily be changed for direct changes according to specific needs.

An example of a preform manufacturing using the SIU is now given.

An empty moving support 42, where the preform will be built up, is placed on the electronic balance 44. The support moves under a charging unit 40. This charging unit contains for example a stock of discontinuous glass fibres, or any other kind of fibres, which fall down through a ventilated tube in order to distribute the fibres. At the bottom of the tube the fibres go through the collimator 41 where they are oriented before to reach the support. The oriented fibres form, on the support, the first layer of reinforcements. When the selected weight of fibre is reached, the balance and the support move to a second charging station filled in with polymer powder. The powder is guided down by a ventilated tube and is distributed on top of the fibre layer. When the balance indicates that the selected weight of polymer is reached, the support moves to a third station, the preform preconsolidation unit, equipped here with an infra-red heater 46 and a press 47. The polymer powder melts and is compressed in order to preconsolidate the preform. The control system of the SIU allows to repeat each or several of the sequential lay-up and preconsolidation steps in order to build up the preform structure. By this technique, a multilayered preform containing polymer and discontinuous oriented reinforcements is made. The preforms are then used by other unit like MTR and IPU for the final consolidation and integration within a composite integrated part.

Of course other types of reinforcements and polymers can be use and/or combined. The example illustrates the manufacturing of flat preform but more complex curved preforms are possible by changing the geometry of the press plates. The SIU-unit allows also the introduction of continuous fibre prepregs into the sequence of preform layers.

The Tow Impregnation Unit (TIU)

The main functions of this unit are:
produce impregnated and preconsolidated preform tows in a continuous manner,
deliver preforms with given material state (temperature, consolidation level . . . ) to the IPU.

Figure 14:
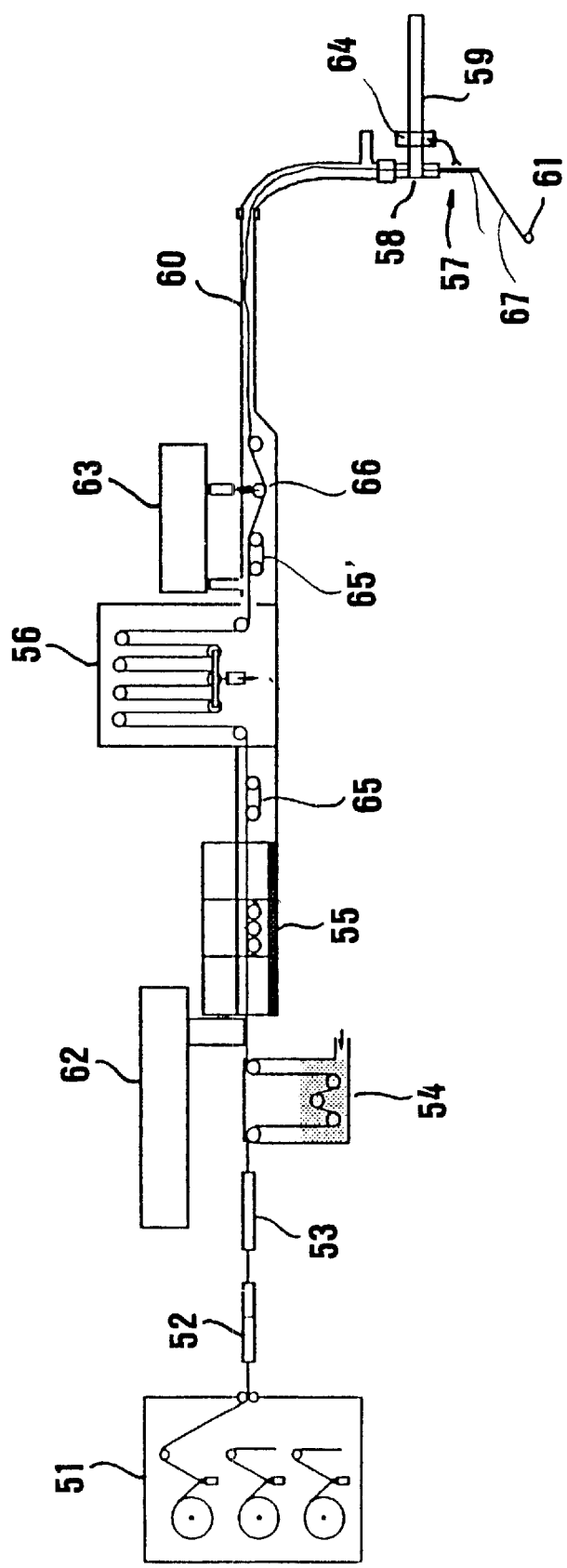
FIG. 14 is a schematic example of impregnation and consolidation line for continuous tow impregnation (TIU).

The different components of the impregnation line presented here are shown schematically in FIG. 14. The unit comprises spools 51 for fibre delivery. A fibre spreader 52 and a unit for fibre surface treatment 53 are provided. Spreaded and eventually surface treated fibres are impregnated by polymer in a fluidise bed unit 54. Wetting of the fibres by the polymer and preconsolidation of the tow take place in the oven 55. The tow is pulled continuously into a stocking cupboard 56 from where is driven to the lay-up nozzle 57 comprising a final heated channel 58 and an arm 59 for connection with the robot gripper the whole unit being specifically designed for tow placement into the mould by the robot (MTR unit). A movable and flexible heated channel 60 is designed to guide the tow and control its temperature from the oven outlet to the final free position 61 where the tow will be used. After the tow placement, cutting nippers 64, or any other suitable cutting means, fixed on the arm 59, moves and cut the tow. Several control units 62, 63 adjust continuously and automatically, by means of driving 65, 65' and guiding 66 devices, the various processing parameters: polymer content of the tow, pulling force, temperatures in ove elements, in the stocking box and in the two channels, etc.

The specific capabilities of the TIU are:
Facilitate subsequent processing steps:
Impregnation is a critical and often expensive step in the manufacturing of composites. On site delivery of preconsolidated preforms facilitate further processing phases (see description of RAFMAC).
On-line control of preform quality:
Different types of fibres and polymers can be used at the beginning of the line and all the different subunits are designed to offer maximum flexibility in the control of the different processing parameters. Regulation of spread width, powder content, consolidation temperature, line speed, etc. are adapted to each specific material system and final desired tow performance.
Preparation of existing preforms:
Preforms, containing polymer fibres or powders combined with reinforcing fibres, like FIT ("Fibres Imprégnées de Thermoplastiques"=thermoplastic powder impregnated fibres) or commingled tows can enter the developed line at any point to be preconsolidated and then placed for the integrated processing.

The Tape Consolidation Unit (TCU)

The main functions of this unit are:
place and consolidate composite tapes (prepregs)
produce composite components with concave and convex shapes to be integrated afterwards in the IPU and/or in the SOU As on existing equipment, several components (heating elements, set-up to apply local pressure, tape spool) are assembled on a support which is handled by a robot. Heat and pressure are applied locally to melt and consolidate the composite tape during its deposition by the robot on a complex shaped tool or mandrel. This operation is handle by the multi-tasks robot (see description of the MTR unit).

The Support Operation Unit (SOU)

The Support Operation Unit is a post operation unit, where several different operations may be performed, such as:
Assembling
Finishing
Quality control a) The Assembling Unit (AU)

The main functions of the AU are, when necessary, to apply heat and pressure to bond different components.

Even if the integrated processing unit (IPU) allows to produce 'in-situ' bonds between different components of an integrated part, it is possible with the SOU to assemble several parts using fusion bonding. A robot of the MTR unit can for example move a heating elements like a torch or a coil to induce heat at the interface to be bonded. Deposition of adhesives is also an operation completely robotised. Robots can be used to place and fixate inserts or connection elements.

b) The Finishing Unit (FU)

The main functions of the FU are to perform post operations (if necessary) of the part (flash removal, improve the final shape, surface appearance etc.) and to place the moulded part in a cooling fixture for dimensional control.

As for the assembling unit the finishing unit is an added value since the advantage of the integrated processing is to deliver finished products. Nevertheless, a robot of the MTR unit can be used to manipulate different tools like water-jet or laser cutter, polishing machines, etc. These operations can be used during preform preparation as well as on demoulded parts.

Upon demoulding at high temperatures, it may be necessary to place the part in a cooling fixture in order to control the final dimensions.

c) The Quality Control Unit (QCU)

The main function of the QCU is the control of component quality at different phase of its processing route.

A robot of the multi-task unit can select and place a preform or an integrated part under a specific quality analyser equipment (C-scan, IR camera, polarised light, etc.).

The Multi-Tasks Robotised unit (MTR)

The main functions of the MTR unit are:

establish and control automatic synchronisation between all processing units manipulate and place, and if necessary cut, different preforms and processed part components use and run different tools for TCU, SOU, FU and QCU units Implementation of several machines and tools are necessary to achieve the main cited functions of manipulation and 'orchestration' of the different units.

a) Synchronisation and controls are established by computer and electronic equipments.

b) A multi-task robot, for example an angular type robot, with access to all the different units, and with high precision for fibre tow and preform lay-up into the mould.

c) As represented on FIG. 11, the robot is able to manipulate special tools previously described for tape consolidation (TCU), assembling (SOU), finishing (FU) and quality control (QCU).

This multi-task unit is developed to achieve one of the main goal of the integrated processing concept which is to offer the complete processing line, from fibre and resin to the final finished part. Consequently, this unit is the key link for what we will describe in the processing strategy as RAFMC.

The specific capabilities of the MTR are:

Tow placement:

A robot is selected to place precisely in preselected directions the tows delivered by the impregnation line (TIU) into the moulds of the integrated processing unit (IPU). Commercial tows like FIT or commingled can also be used.

Composite preparation:

The unit allows CAD-controlled layout of continuous pre-consolidated composites

Combination of preforms:

Special preforms with a given shapes can be placed and removed from moulds in order to increase design freedom and increase the number of final shapes available.

Flexibility for potential new capabilities:

Adjustable die for "pultrusion" of different preform diameters and shapes into the mould.

Manipulations of tools, preforms and processed parts.

Description of Material Processing Steps

Several of the various manufacturing routes of polymers and composites (FIG. 4) are combined to achieve parts geometry, performance and multifunctionality, defined in the integrated processing concept. Some processes like injection-moulding and press-forming have been well studied and are currently used world-wide. The novel aspects are related to some new equipment designs, new manufacturing (processing) concepts, and the sequence of integrated operations. Consequently, their integration requires some specific adaptations and process optimisation. All the different processing steps and methodologies are described in FIG. 11.

The Press-forming Process

This process is located in the IPU.

Description & Goals:

a versatile forming method allowing several different material (composite) forms and/or processing concepts to be used, the pressforming can be performed in coining mode (injection-compression), the pressforming unit is designed for the condition required by the stamping (GMT) process, the mould can be built with a "match-die-mould" concept, allowing both injection moulding and compression moulding to be performed within the same mould, the mould can be cycled in temperature during a processing cycle in order to perform the material integration under optimal thermal conditions.

Specifications related to integrated processing:

the pressforming technique serves as the universal concept for bringing the mould-halves together and providing the required contact pressure, the coining process permits volumetric injection of the melt in a semi-open mould. This method considerably reduces the shear forces acting on the inserted fibre-bed. The melt placement in the mould could either be directly done by the injection unit or by slit-die extrusion of a film covering the mould through the slit-die. This will also led to a reduction of the forces acting on the fibre-bed, the pressforming capabilities may be used to provide the required contact pressure between parts to be integrated (joint) during the moulding.

The Multi-injection Moulding

This process is located in the IPU.

Description & Goals:

to facilitate several different materials to be injected during the same cycle, provide the possibilities for material integration by combined injection from the two different units, selection of suitable injection location according to part and mould restrictions.

Specifications related to integrated processing:

give possibilities for sequential mouldings before and after composite forming By this method material integration with the preform may be possible, directly following the forming of the composite preform. The horizontal and the vertical positioning of the injection unit permits injection to be done by central gating from the top and/or from the side of the mould, in the case of reactive resins the RTM, RIM or LIM injection capabilities are used.

The Impregnation

This process is located in TIU and SIU.

Description & Goals:

Provide a preform with well dispersed polymer (powder, fibre) and reinforcing fibres. A homogeneous distribution of the polymer and the reinforcing material facilitates preconsolidation and final consolidation which is to be performed in later stages of the process. A homogeneous resin/reinforcing material distribution minimises the polymer flow length and thereby the required consolidation time and pressure.

Provide a loosely connected preform with potential for enhanced spontaneous wetting of the fibres. The wetted but loosely consolidated preform provides a favourable degree of drapability of the preform for charging the mould, and furthermore r educes the important wetting stage during the following final consolidation.

Powder: It is well known that fine powder (10–300 $\mu$m) of the matrix polymer could be introduced into the fibre bundle in order to facilitate the consolidation and compaction of the preform. The fine powder considerably shortens the flow length and thereby the required consolidation time and pressure, as can be described by the Darcy's law. This technique is commercially used today and is further developed and modified to suit the integration to the RAYMAC set-up.

Polymer fibres: An alternative method to the powder route is to use commingled fibre of the polymer and the reinforcing fibres. The technique provides similar advantages as the powder route with respect to the reduction of the flow length during impregnation.

The advantages with both the powder and the fibre technique is that tailored preform tows may be made, with for example combining braided and unidirectional fibres in the tow, which is to be placed into the mould. Furthermore, weaved or braided preform sheets can be produced which gives potential for multi-directional preform to be produced.

Liquids: Reactive polymers with low viscosity can be directly injected in tow and sheet preforms. In this case impregnation and preconsolidation are realised during the same processing step.

Specifications related to integrated processing:
The sheets from the SIU or the TIU is suited for being introduced into the IPU for further forming operations and final consolidation.
With the impregnation stage linked with the complete manufacturing, permits potential material changes as well as fibre contents changes to be made within the processing line.

Tow
By the specially designed nozzle of the TIU-line controlled and manipulated by the robot, the preimpregnated tow is brought above the softening temperature and placed into the mould. The tow form of the preform serves as a suitable shape for the placement into the mould.
In order to combine the continuous production of the TIU-line with the discontinuous fibre placement in the IP-equipment a intermediate storing unit is placed in between the impregnation stage and the tow-placement-nozzle.

Sheet
The loosely preconsolidated preform provides the suitable drapability of the sheets.
The sheet preform which exhibits a combinations of different fibre orientations and/or fibre length, gives the potential for flow forming according to the GMT-process.
The preheated sheets is taken by the MTR and moved into the IPU for forming and consolidation.

The Preconsolidation This process is located in TIU, SIU, TCU.
Description & Goals:
The initial impregnation stage is followed by the preconsolidation stage. It is the purpose of this processing stage to initiate and enhance a spontaneous wetting of the fibre bed by the polymer, without diminishing the required drapability of the preform.
Specifications related to integrated processing:
The preconsolidation should be pursued just until a light interaction is obtained between the fibres in order to maintain some degree of drapability of the fibre tow or the sheet preform. However, it is the purpose of the preconsolidation to achieve an initial wetting of the fibres in order to reduce the later final compaction and consolidation.
In the TIU the preconsolidation is performed in a continuous manner, which permits constant conditions to be achieved. The following tow-placement is done in a discontinuous manner during the mould charging phase, which means that a intermediate storage unit has to be used.
In the case of liquid injection moulding (LIM, RIM and RTM) impregnation and consolidation are realised during the same step.

The Tow placement
This process is located in MTR and IPU.
Description & Goals:
A cost-effective manner to introduce continuous fibre reinforcements into a complex shaped mould
To introduce reinforcements into the mould at high placement control and at elevated temperature
Achieve high freedom of changing fibre placement between consecutive mouldings, in order to obtain maximum efficiency of the fibre reinforcement.
Specifications related to integrated processing:
The not fully consolidated tow exhibits a high degree of flexibility which allows a large degree of freedom during placement into the mould by the MTR.
The preconsolidated tow deliver ed by the TIU-unit is guided through a heated flexible tube into a heated nozzle which is controlled (position, speed, pressure) by the MTR.
The MTR places the tow into the mould according to a pre-set pattern, determined by the performance (strength, stiffness) requirements.
The positioning of the MTR-arm and thereby the placement of the tow is controlled by the control-unit computer of the robot. This information is directly given by the CAD-information.
As the heated tow is delivered from the nozzle of the TIU-equipment and placed into the mould a loose contact (fusion bonding) is achieved between the different windings. The following injection of the melt provides the necessary temperature and pressure for the final consolidation of the interior of the tow, between the tows and between the tows and the injected melt.

The Lofting
This process is located in SIU and IPU.
Description & Goals:
During the fabrication of the SIU-preform elastic forces is stored in the fibre-bed and looked in this position by the solidified melt. The elastic forces are governed by the high degree of fibre/fibre interaction initiated by the pre-consolidation pressure applied for compaction and wetting of the fibre bed.
Use the expansion of the SIU-preform as enlargement of the contact area between the preform and the injected melt.
Use the by the lofting increased porosity for allowing the injected melt to penetrate into the SIU-preform.
Provide a gradient interface between the sheet-preform and the injected polymer melt.
Specifications related to integrated processing:
Due to the elastic forces stored in the fibre bed of the SIU-preform an expansion (lofting) upon re-melting of the matrix material is taking place. This phenomena provides a drastic increase of the surface area of the preform. Furthermore, the increase of the porosity of the preform allows the injected melt to penetrate into the interior of the preform giving enhance mechanical inter-looking as well as a gradient interphase between the two material forms.

The Joining/bonding
This process is located in IPU, SOU and TCU.

Description & Goals:

Interface strength is the one of the key performance that an integrated part combining several constituents must have. Thermoplastic polymers and composites can be melted and reprocessed, consequently the fusion bonding is the main technique used here. Healing and interface crystallisation are studied to define, for each material system, the processing parameters to achieve a strong and durable bond. Both interfaces are melted then consolidated during the cooling of the part.

Mechanical fastening and bonding techniques using adhesives (glu, hot melt films . . . ) are also envisaged.

Specifications related to integrated processing:

fusion bonding is applied and controlled 'in situ' during processing on the IPU or as one bonding process during the assembling steps (SOU).

the IPU can be used to extrude or inject a adhesive layer.

LIM can be used to place adhesive polymer.

The MTR unit allows to place inserts, connectors, etc for mechanical fastening.

The Consolidation

This process is located in TCU and IPU.

Description & Goals:

To provide fully wetted fibres and a void free part.

Use the injected polymer to provide heat and pressure in combination with the press-forming unit for the final consolidation.

Specifications related to integrated processing:

Use the melt injected by one of the two injection unit as the pressure media as to achieve a near-hydrostatic consolidation pressure for the inserted composite preforms (from SIU-equipment and/or TIU). By using the melt itself as pressure media a intimate contact may be achieved. Furthermore, a tailored compatible material can be used which forms a integrated part of the moulded structure. Identical concept is applicable when using liquid injection.

Direct match-die press-forming gives local pressure peaks at fibre-bundle crossings and overall pressure variation due to mould-angels with respect to the applied pressure direction. This disadvantage is eliminated by applying the pressure by the injected melt itself.

The Release of internal stresses

This process is located in IPU.

Description & Goals:

The integration of materials with different thermomechanical properties will in most cases introduce a considerable level of residual stresses into the structure. These stresses has to be eliminated or diminished in order to achieve the required performance of the product. Stress relies may be obtained by:

the temperature cycle of the mould, allowing stress relaxation at elevated temperature.

reduction of the volume contraction. This may be obtained by a controlled initiation and growth of voids during solidification.

Specifications related to integrated processing:

The mould in the IPU is equipped with temperature cycling capabilities, to be used for optimising the healing conditions and to reduce the stresses upon solidification.

The inner-gas (gas-inject) capabilities of the equipment allows controlled voids to be initiated and developed. By this the difference in volume contraction during solidification and cooling may by minimised.

The Extrusion of Interlayers and Surface Layers

This process is located in IPU.

Description & Goals:

provide a interlayer between different materials (material forms) in order to enhance their integration and healing. The interlayer may be a special tailored material promoting the healing between two different material types.

provide a surface layer (coating) onto the final product.

provide a layer in between materials with different thermomechanical properties for stress relies.

provide the capabilities for a gradient interface between different material forms Specifications related to integrated processing:

As described earlier the integrated processing technique gives potential for using different material and process combinations. By the extrusion of a interlayer in between different mouldings a material could be introduced which enhance the adhesion between the materials.

The melt film could also be seen as providing the thermal inertia needed for a successful healing.

If a dry fibre preform is introduced into the mould the following introduction of the melt has to be done under low shear forces in order to not destroy the integrity of the fibre-bed. The extrusion of the interlayer on top of the fibre-bed considerably reduces the shear forces in comparison to conventional injection of the melt. Furthermore, the impregnation distance (perpendicular to the fibre-bed) is reduced in comparison to injection when impregnation has to be done along the fibre-bed.

When material of different thermomechanical properties are integrated it is beneficial to create a interfacial region with gradient properties for the reduction of stress concentrations in the interfacial regions.

The Inner Pressure Forming (Gas-inject)

This process is located in IPU.

Description & Goals:

The gas-inject capabilities of the equipment gives the possibility to inject the melt together with a gas, which gives a hollow moulding. The gas pressure gives the necessary pressure for consolidation and forming of a part with high surface finish requirements.

provide the capabilities for manufacturing of hollow structured parts, both with and without fibre preform.

give potential for residual stress relies by compensation of the volume contraction, by controlled internal void initiation and growth.

Specifications related to integrated processing:

As described earlier the joining of materials with different thermomechanical properties may initiate residual stresses in the structure during the processing cycle. The difference in volumetric thermal contraction may be compensated by the growth of internal voids. The gas-inject capability of the IPU will provide this feature.

By the inner-pressure technique lower moulding pressure may be used which allows forming under more sensitive conditions with respect to potential destruction of the fibre-bed.

By the inner-pressure technique different sub-elements of the integrated part may be combined and joint together by the melt-gas-bubble.

Furthermore, expansion of weaved dry fibre tubes to the mould surface could be envisaged for the production of hollow composite structures.

Examples of Integrated Manufacturing Routes Using the Robot Assisted Flexible Manufacturing Concept for Composites (RAFMAC)

The integrated processing system introduces the integration of various material processing steps (described here above) by the means of the combined uses of all units also previously described. The following describes how different units can be combined sequentially to provide material processes required for the manufacture of integrated composite part.

Integration of various semi-products and commercial preforms is realised by using the MTR for preforms and part manipulations associated with the IPU where the respective processing steps are performed. All these combined integrations will be defined as type A processing routes for part manufacturing (FIG. 15).

Figure 15:
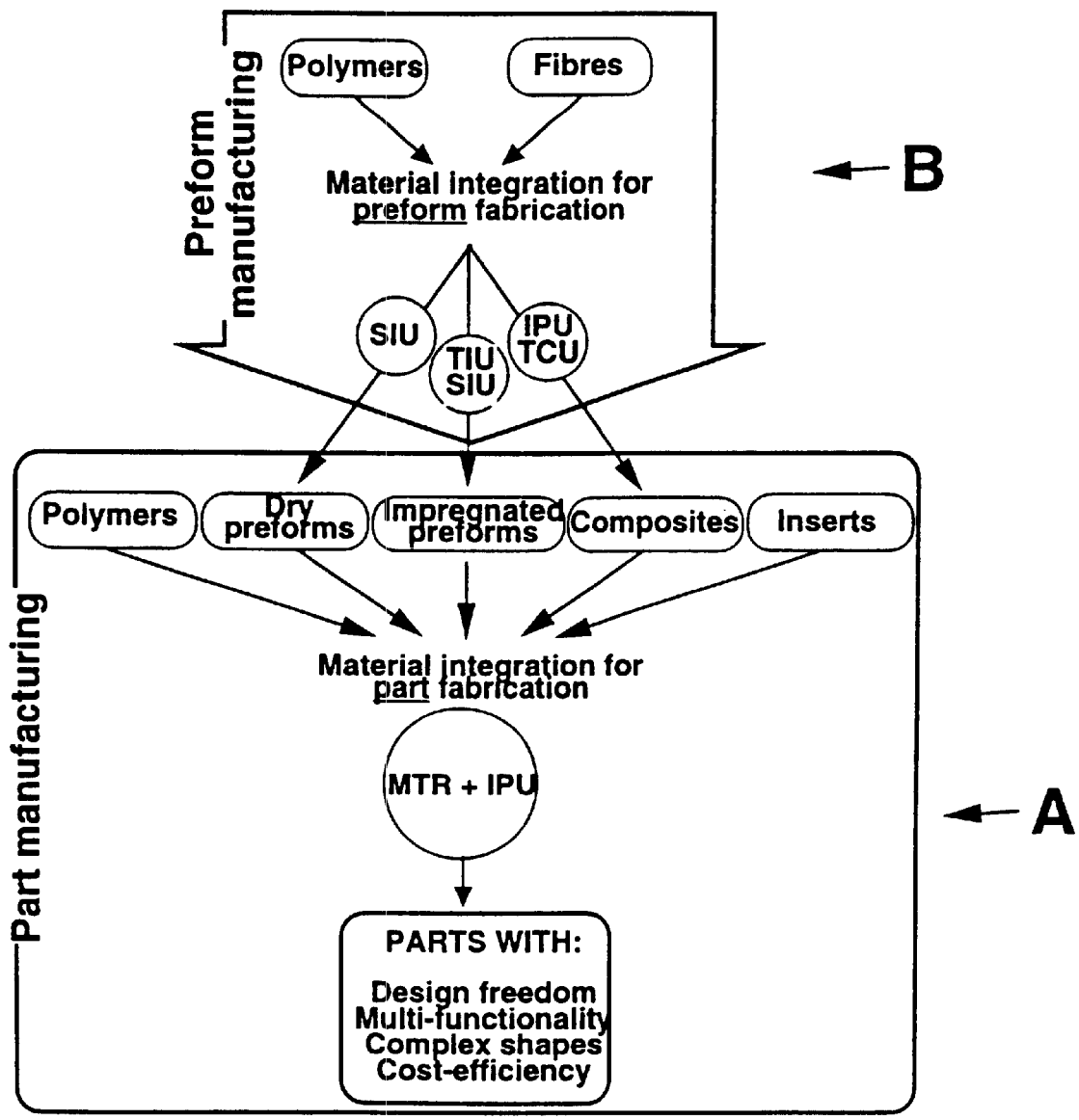
FIG. 15 illustrates classifications of integrated processing routes.

The different processing routes for manufacturing of preforms will be entitled type B routes (FIG. 15). Processing routes of type B+A open a larger horizon for the integrated processing concept as they provide freedom in preform design and fabrication. Type B+A routes integrate preform and final part manufacturing (FIG. 15).

Figure 16:
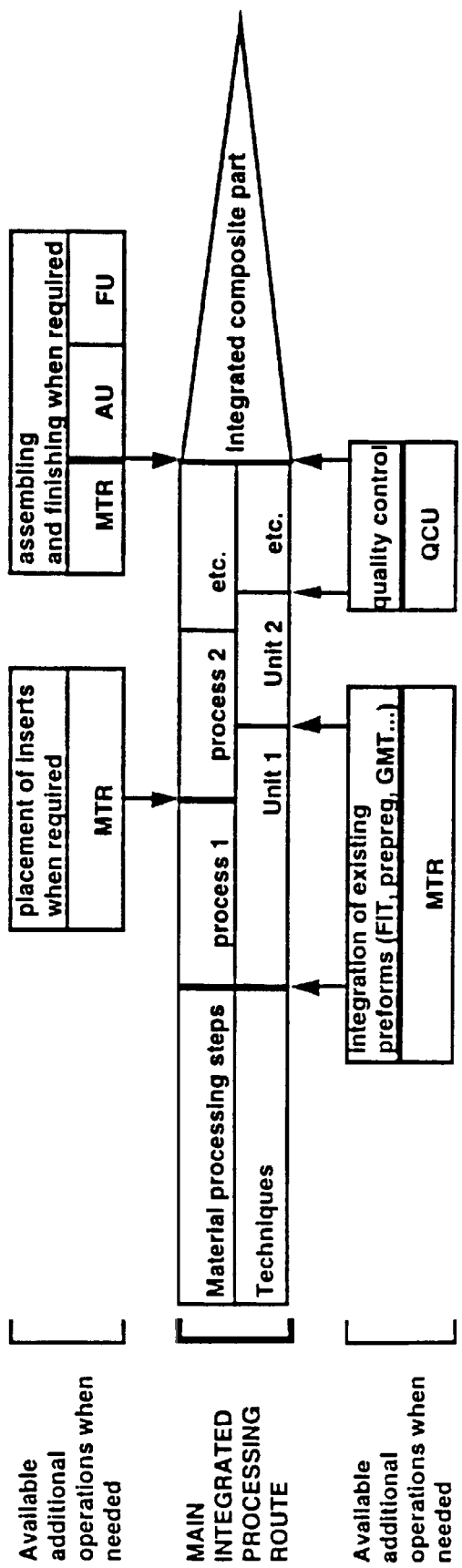
FIG. 16 is a schematic representation explaining how the different processing routes of the RAFMAC concept will be described. Additional operations are used in each main processing route when required.

Consequently, the robot assisted flexible manufacturing concept (RAFMAC) is defined here as the set of all combinations of integrated processing routes. Each route is described by a series of material processing steps and techniques (equipment units) (FIG. 16). Additional operations can be integrated at any point of all processing routes and in function of the application requirements: placement of insert, assembling, etc. The MTR unit also allows to place preforms, semi-products or components available on the market like FIT, GMT, etc.

The integrated processing unit (IPU) combines several forming and moulding units that can be used either separately or sequentially to define processing routes of type A. Examples of the main resulting processing routes are listed hereunder in the forma presented in FIG. 16:

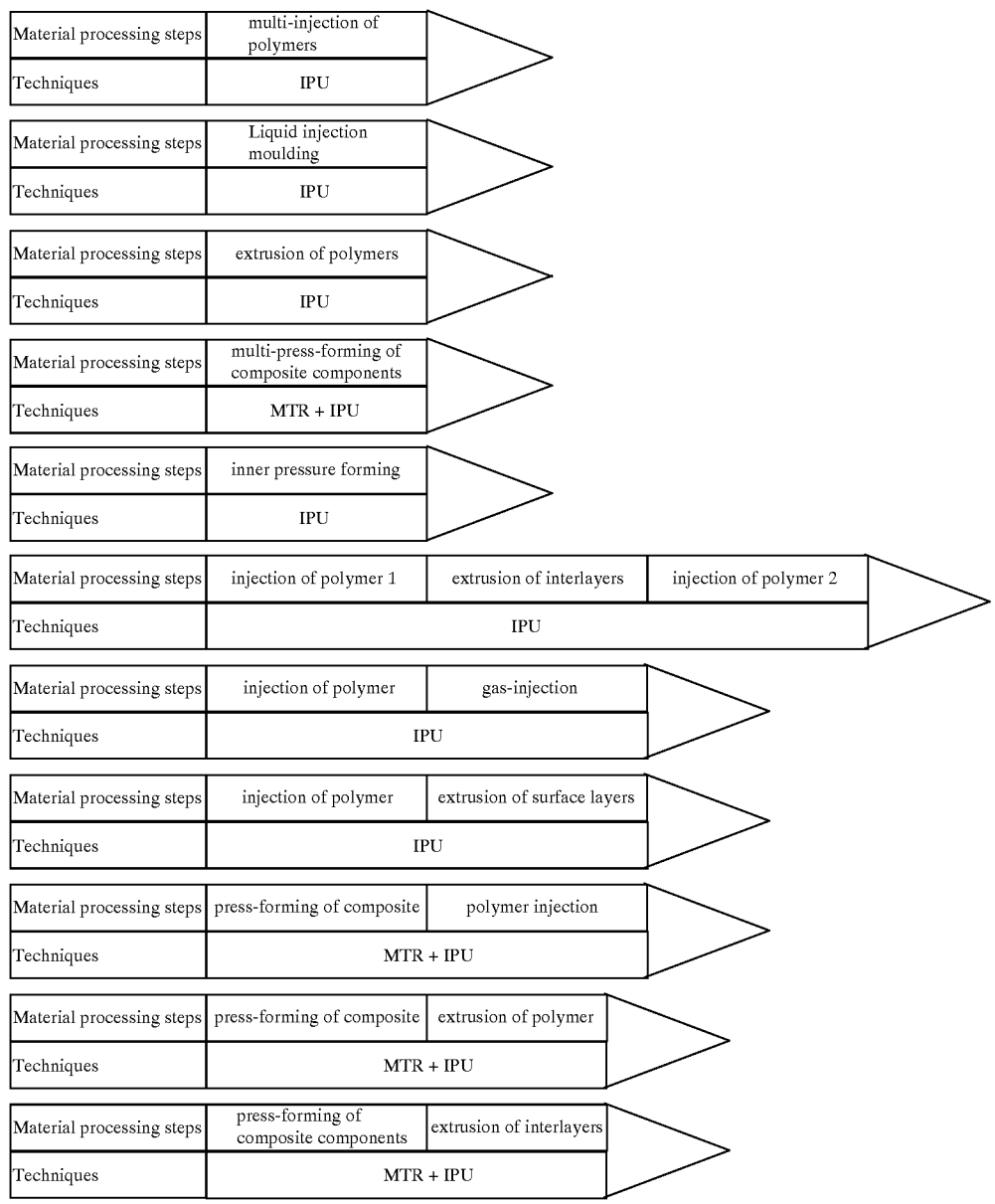

-continued

| Material processing steps | press-forming of composite 1 | press-forming and bonding of composite 2 |
|---|---|---|
| Techniques | MTR + IPU | |

| Material processing steps | press-forming of composite components | preheating of a component | non-isothermal bonding |
|---|---|---|---|
| Techniques | MTR + IPU | | |

| Material processing steps | Repetition of one processing route of type A |
|---|---|
| Techniques | related units |

| Material processing steps | Sequence of several processing routes of type A |
|---|---|
| Techniques | related units |

With the combination of all available units for the on-line direct preparation and manufacturing of different preforms, the number of processing routes increases remarkably. Examples of these type B+A routes integrating preform and part manufacturing are listed hereunder:

temperature and state in order to allow and facilitate deposition and placement of the tow in the mould. The MTR unit places the reinforcement tow into one of the moulds 21 (see FIGS. 11 and 12). in precise directions following a path determined to optimise the mechanical resistance of the

| Material processing steps | dry or impregnated sheet preform preparation | placement | press-forming | consolidation |
|---|---|---|---|---|
| Techniques | SIU | MTR | IPU | |

| Material processing steps | dry or impregnated sheet preform preparation | placement | polymer injection or liquid injection | consolidation |
|---|---|---|---|---|
| Techniques | SIU | MTR | IPU | |

| Material processing steps | dry or impregnated sheet preform preparation | placement | any processing route of type A |
|---|---|---|---|
| Techniques | SIU | MTR | MTR + IPU |

| Material processing steps | impregnation and preconsolidation of tows | placement | press-forming | consolidation |
|---|---|---|---|---|
| Techniques | TIU | MTR | IPU | |

| Material processing steps | impregnation and preconsolidation of tows | placement | polymer injection or liquid injection | consolidation |
|---|---|---|---|---|
| Techniques | TIU | MTR | IPU | |

| Material processing steps | impregnation and preconsolidation of tows | placement | any processing route of type A |
|---|---|---|---|
| Techniques | TIU | MTR | MTR + IPU |

Example of an integrated part manufactured using one of the routes B+A (TIU+MTR+IPU):

The first step is the selection of the reinforcing fibres as the reinforcement material and their preparation for entering a preform manufacturing unit, here the TIU for example. The filaments of the fibres are spread in the spreader 52 (see FIG. 14) before to enter the fluidised bath 54 containing the selected polymer as powder. The polymer penetrates the tow of filaments. The tow is then driven inside a preheated oven 55 where powder particles melt and adhere to the filaments. The tow is now partly impregnated and ready to be handled by the MTR unit. A channel 60 guides the preimpregnated tow to the top of an arm 59 fixed to the robot gripper. This arm is equipped with la hot nozzle 57, 58 and cutting nippers 64. The tow goes inside the nozzle which controls its future part. The 3-dimensional path is calculated and transferred to the robot computer which control the moves of the robot arm inside the working space of the IPU. By this manner, several tows are placed inside one of the moulds of the rotating table 20 of the IPU. The tow is cut by the cutting nippers and the preheated mould is then closed and the vertical injection unit 25 is automatically selected and prepared by the command unit of the IPU. The injection unit delivers a polymer at temperature and pressure optimised for this part. The injected polymer fills in the cavity around the impregnated tows placed by the MTR unit and simultaneously applies the pressure for the final consolidation of the tows. By this, the injection pressure is used simultaneously to fill the mould and to consolidate the reinforcement tow. When the moulding has reached a temperature which allows ejection of the part, the mould is opened and the IPU ejects the part from the mould. The sequences can now be repeated within the same mould or in a second mould.

For this example of integrated part, the injected polymer provides external complex shape and surface finish. The inside structure of impregnated reinforcing fibres offers directional mechanical properties. When needed, other functions and/or performance can be added by automatic use of other available units of the integrated equipment or by integration of other polymer and/or reinforcement types.

What is claimed is:

1. Process for an integrated manufacture of a composite product comprising an in-situ final forming of at least one composite preform at a location of the moulding operation in an integrated moulding operation, wherein said composite preform comprises a reinforcing material and a first matrix material, said process comprising a first step of impregnating said reinforcing material by said first matrix material, a second step of pre-consolidating said reinforcing material impregnated by said first matrix material, said process comprising a third step of in-situ final placement of said reinforcing material impregnated by said first matrix material into said location, thereby forming said pre-consolidated composite preform, wherein said in-situ placement is performed through heated means that maintain said reinforcing material impregnated by said first matrix material at an elevated temperature, and wherein said integrated moulding operation comprises a step of material integration by further providing a second thermoplastic matrix material in a melted state at said location to at least partially enclose and bond to said pre-consolidated composite preform, said second melted matrix material being used as a pressure media providing heat and a consolidation pressure within said location for both an in-situ final consolidation of said composite preform and for moulding and final consolidation of the composite product and wherein said first step, said second step, said in-situ placement and said moulding operation are performed within one uninterrupted fabrication cycle.

2. Process according to claim 1, wherein said integrated moulding operation comprises at least one step selected from the group consisting of a polymer injection step, a gas injection step, a liquid injection step, an interlayer extrusion step, and combinations thereof.

3. Process according to claim 1, where in said uninterrupted cycle comprises forming said at least one preform through orientation of fibres, impregnation and preconsolidation of a fibre-based preform, and in-situ placement of said preform in a predetermined oriented direction within said location of said integrated moulding operation.

4. Process according to claim 3, wherein said uninterrupted cycle comprises the steps of impregnating and pre-consolidating a fibre-based composite to form an impregnated tow preform and placing said impregnated tow preform in a predetermined orientation into said location through a guided temperature and position-controlled nozzle.

5. Process according to claim 1, wherein said integrated moulding operation comprises an inner-gas injection step for manufacturing hollow structured composite parts, and wherein said injected inner-gas is used for consolidation and for release of process induced stresses developed from the integration of different material forms.

6. Process according to claim 2, wherein said integrated moulding operation comprises an inner-gas injection step for manufacturing hollow structured composite parts, and wherein said injected inner-gas is used for consolidation and for release of process induced stresses developed from the integration of different material forms.

7. Process according to claim 1, comprising introduction of an extruded slit-die film into a consolidation mould in order to provide at least one of the following capabilities: compatibility of different integrated materials, gradient interface between integrated materials and material forms, release of interfacial stresses, surface coating onto the final part and through-thickness resin impregnation.

8. Process according to claim 2, comprising introduction of an extruded slit-die film into a consolidation mould in order to provide at least one of the following capabilities: compatibility of different integrated materials, gradient interface between integrated materials and material forms, release of interfacial stresses, surface coating onto the final part and through-thickness resin impregnation.

9. Process according to claim 1, comprising the steps of impregnating and preconsolidating a fibre-based composite to form an impregnated tow preform and placing said impregnated tow preform in a predetermined orientation into said location through a guided temperature and position-controlled nozzle.

10. Process according to claim 1, wherein said uninterrupted cycle comprises the steps of impregnating and pre-consolidating a fibre-based composition to form an impregnated sheet preform.

11. Process according to claim 3, wherein said uninterrupted cycle comprises the steps of impregnating and pre-consolidating a fibre-based composite to form an impregnated sheet preform.

* * * * *

UNITED STATES PATENT AND TRADEMARK OFFICE
CERTIFICATE OF CORRECTION

PATENT NO.   : 6,495,091 B1
DATED        : December 17, 2002
INVENTOR(S)  : Jan-Anders Manson, Pierre-Etienne Bourban and Francois Bonjour It is certified that error appears in the above-identified patent and that said Letters Patent is hereby corrected as shown below:

Column 3,
Line 39, please delete "performdirectly" and insert in lieu thereof -- perform directly --.
Line 61, please delete "forming, techniques" and insert in lieu thereof -- forming techniques --.

Column 4,
Lines 3 and 5, please delete "Mason" and insert in lieu thereof -- Manson --.
Line 37, please delete "has-been" and insert in lieu thereof -- has been --.

Column 6,
Line 2, please delete "(IPU.)" and insert in lieu thereof -- (IPU) --.
Line 62, please delete "The-machine" and insert in lieu thereof -- The machine --.

Column 9,
Line 23, please delete "be use" and insert in lieu thereof -- be used --.
Line 39, please delete "in a fluidise bed" and insert in lieu thereof -- in a fluidised bed --.
Line 42, please delete "from where is driven" and insert in lieu thereof -- from where it is driven --.
Line 44, please delete "with the robot gripper the whole unit" and insert in lieu thereof -- with the robot gripper, the whole unit --.
Line 55, please delete "ove elements" and insert in lieu thereof -- oven elements --.

Column 11,
Line 27, please delete "RAFMC" and insert in lieu thereof -- RAFMAC --.

Column 12,
Line 60, please delete "r educes" and insert in lieu thereof -- reduces --.

Column 13,
Line 2, please delete "RAYMAC" and insert in lieu thereof -- RAFMAC --.

Column 14,
Line 21, please delete "deliver ed" and insert in lieu thereof -- delivered --.

UNITED STATES PATENT AND TRADEMARK OFFICE
CERTIFICATE OF CORRECTION

PATENT NO.     : 6,495,091 B1
DATED          : December 17, 2002
INVENTOR(S)    : Jan-Anders Manson, Pierre-Etienne Bourban and Francois Bonjour It is certified that error appears in the above-identified patent and that said Letters Patent is hereby corrected as shown below:

Column 18,
Line 19, please delete "forma presented" and insert in lieu thereof -- format presented --.

Column 19,
Line 66, please delete "with 1a hot nozzle" and insert in lieu thereof -- with a hot nozzle --.

Signed and Sealed this

Twelfth Day of August, 2003

JAMES E. ROGAN
*Director of the United States Patent and Trademark Office*